(12) United States Patent
Mizuta

(10) Patent No.: US 12,166,940 B2
(45) Date of Patent: Dec. 10, 2024

(54) FUNCTION EXTENSION APPARATUS, INFORMATION PROCESSING SYSTEM, AND CONTROL METHOD FOR FUNCTION EXTENSION APPARATUS

(71) Applicant: SEIKO EPSON CORPORATION, Tokyo (JP)

(72) Inventor: Masahiko Mizuta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/187,313

(22) Filed: Mar. 21, 2023

(65) Prior Publication Data
US 2023/0308582 A1    Sep. 28, 2023

(30) Foreign Application Priority Data
Mar. 22, 2022    (JP) .................................. 2022-045956

(51) Int. Cl.
    *H04N 1/00*                (2006.01)
    *H04N 1/32*                (2006.01)
(52) U.S. Cl.
    CPC ..... *H04N 1/32149* (2013.01); *H04N 1/00209* (2013.01); *H04N 1/32037* (2013.01)

(58) Field of Classification Search
CPC .......... H04N 1/00127; H04N 1/00209; H04N 1/32149
USPC ................. 358/1.13, 3.28, 1.15, 403; 399/16
See application file for complete search history.

(56) References Cited

U.S. PATENT DOCUMENTS

| | | | |
|---|---|---|---|
| 6,178,308 B1 * | 1/2001 | Bobrow | G09B 7/00 434/350 |
| 2007/0178432 A1 * | 8/2007 | Davis | G09B 7/02 434/353 |
| 2021/0014371 A1 * | 1/2021 | Utoh | H04N 1/00411 |
| 2021/0368048 A1 | 11/2021 | Hara | |

FOREIGN PATENT DOCUMENTS

JP          2021-184178 A      12/2021

* cited by examiner

*Primary Examiner* — Jamares Q Washington
(74) *Attorney, Agent, or Firm* — WORKMAN NYDEGGER

(57) ABSTRACT

A function extension server receives first scan data including a pattern image obtained by encoding additional information, and destination information indicating a destination of the first scan data, decodes the pattern image to acquire the additional information, and transmits the first scan data and the additional information to the destination indicated by the destination information.

11 Claims, 9 Drawing Sheets

| CONTENT ID | FILE NAME | FIRST CONTENT FILE |
|---|---|---|
| ABCD | ENGLISH GRAMMAR 1 | PDF |
| ... | ... | ... |

*FIG. 4*

| USER ID | NAME | ADDRESS | SELECTED SUBJECTS | MAIL ADDRESS |
|---------|------|---------|-------------------|--------------|
| STU··· | ●○△□ | ××KEN ××SHI | ENGLISH, MATHEMATICS | ××@×××× |
| ... | ... | ... | ... | ... |

| CLIENT ID | SECRET KEY | ACCESS TOKEN | REFRESH TOKEN |
|---|---|---|---|
| AAA | 1234··· | ○×△□ | ▓×▲● |
| ... | ... | ... | ... |

343

FUNCTION EXTENSION APPARATUS, INFORMATION PROCESSING SYSTEM, AND CONTROL METHOD FOR FUNCTION EXTENSION APPARATUS

The present application is based on, and claims priority from JP Application Serial Number 2022-045956, filed Mar. 22, 2022, the disclosure of which is hereby incorporated by reference herein in its entirety.

BACKGROUND

1. Technical Field

The present disclosure relates to a function extension apparatus, an information processing system, and a control method for the function extension apparatus.

2. Related Art

There has been known a system that performs printing using the Cloud.

For example, JP-A-2021-184178 (Patent Literature 1) discloses an information processing system including a server and a printing apparatus capable of communicating with the server. The server transmits printing instruction information for instructing printing of teaching material contents and answerer identification information for identifying an answerer who answers the teaching material contents. When receiving the printing instruction information, the printing apparatus generates a print on which the teaching material contents and the answerer identification information are printed.

However, there has been a demand for acquiring additional information added to scan data without changing a configuration of an existing server in a system that performs printing and scan using the Cloud.

SUMMARY

The present disclosure is a function extension apparatus including: a receiving unit configured to receive first scan data including a pattern image obtained by encoding additional information, and destination information indicating a destination of the first scan data; an acquiring unit configured to decode the pattern image to acquire the additional information; and a transmitting unit configured to transmit the first scan data and the additional information to the destination indicated by the destination information.

The present disclosure is an information processing system including an information processing apparatus and a function extension apparatus. The information processing apparatus includes: a receiving unit configured to receive first scan data including a pattern image obtained by encoding additional information; and a transmitting unit configured to transmit the first scan data and destination information indicating a destination of the first scan data to the function extension apparatus. The function extension apparatus includes: a receiving unit configured to receive the first scan data and the destination information; an acquiring unit configured to decode the pattern image added to the first scan data to acquire the additional information; and a transmitting unit configured to transmit the first scan data and the additional information to the destination indicated by the destination information.

The present disclosure is a control method for a function extension apparatus, the control method executing: receiving first scan data including a pattern image obtained by encoding additional information, and destination information indicating a destination of the first scan data; decoding the pattern image to acquire the additional information; and transmitting the first scan data and the additional information to the destination indicated by the destination information.

BRIEF DESCRIPTION OF THE DRAWINGS

FIG. 3 is a diagram showing an example of a configuration of a content management DB.

FIG. 4 is a diagram showing an example of a configuration of a user management DB.

FIG. 5 is a diagram showing an example of a configuration of a client management DB.

DESCRIPTION OF EXEMPLARY EMBODIMENTS

1. Configuration of an Information Processing System

An embodiment of the present disclosure is explained below with reference to the accompanying drawings.

Figure 1:
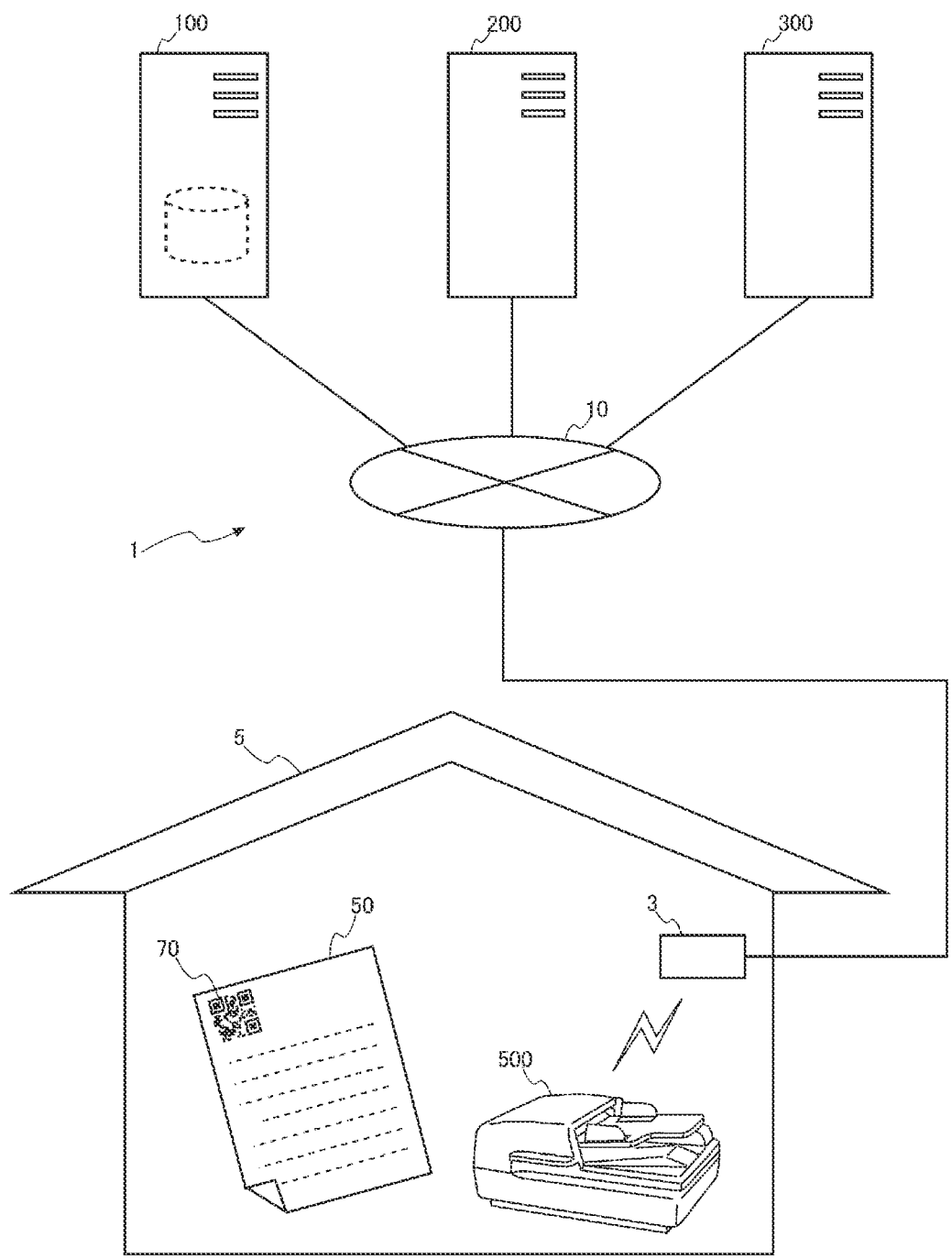
FIG. 1 is a diagram showing a configuration of an information processing system.

FIG. 1 is a diagram showing a system configuration of an information processing system 1.

The information processing system 1 includes a service provision server 100, a function extension server 200, a printing server 300, and a multifunction peripheral 500. The service provision server 100, the function extension server 200, the printing server 300, and the multifunction peripheral 500 are connected via a network 10. The network 10 includes the Internet, a telephone network, and other communication networks. The function extension server 200 is equivalent to the function extension apparatus. The printing server 300 is equivalent to the information processing apparatus.

The service provision server 100 is a server that provides a Web (World Wide Web) service. The Web service provided by the service provision server 100 in this embodiment is a provision service for a first content file. The first content file is, for example, a learning material such as a text or a workbook.

The function extension server 200 is a server that executes functions not implemented in the printing server 300. The function extension server 200 is provided in order to add the functions not implemented in the printing server 300 without changing a configuration of the printing server 300.

The function extension server 200 in this embodiment executes processing for adding a pattern image obtained by encoding additional information to the first content file. The first content file added with the pattern image is referred to as second content file. The additional information is information received from the service provision server 100 and includes, for example, at least one of a user ID for identifying an answerer and a content ID for identifying the first content file that is a teaching material. The user ID is equivalent to the first identification information. The content ID is equivalent to the second identification information.

A case is explained in which the function extension server 200 in this embodiment generates a two-dimensional code such as a QR code as the pattern image. However, the pattern image may be a one-dimensional code or may be a specific character string. QR code is a registered trademark.

The function extension server 200 transmits the generated second content file to the printing server 300.

The function extension server 200 receives scan data from the printing server 300. The function extension server 200 reads a two-dimensional code added to the scan data and acquires additional information. The function extension server 200 transmits the acquired additional information and the scan data to the service provision server 100.

The printing server 300 and the multifunction peripheral 500 establish continuous connection based on a predetermined real-time communication protocol and execute real-time communication. Examples of the real-time communication protocol include an XMPP (Extensible Messaging and Presence Protocol).

The printing server 300 is a server that provides a Web service. The printing server 300 receives the second content file from the function extension server 200 and converts the received second content file into printing data. The printing server 300 transmits the printing data to the multifunction peripheral 500 designated by the service provision server 100 and causes the multifunction peripheral 500 to execute printing.

The printing server 300 receives scan data scanned by the multifunction peripheral 500. The printing server 300 transmits the received scan data and first destination information to the function extension server 200. The first destination information is a URL of a Web page provided by the service provision server 100.

The multifunction peripheral 500 is disposed in a user home 5 of a user having a user contract with a service provider that operates the service provision server 100. The multifunction peripheral 500 is called MFP (Multi Function Peripherals) and includes at least a printing function and a scanner function. The multifunction peripheral 500 may be an apparatus rented from a company or the like that performs rental business or may be an apparatus lent by a school, a cram school, or the like. A wireless router 3 including an access point function is installed in the user home 5. The multifunction peripheral 500 is connected to the network 10 via the wireless router 3.

2. Configuration of the Service Provision Server

Figure 2:
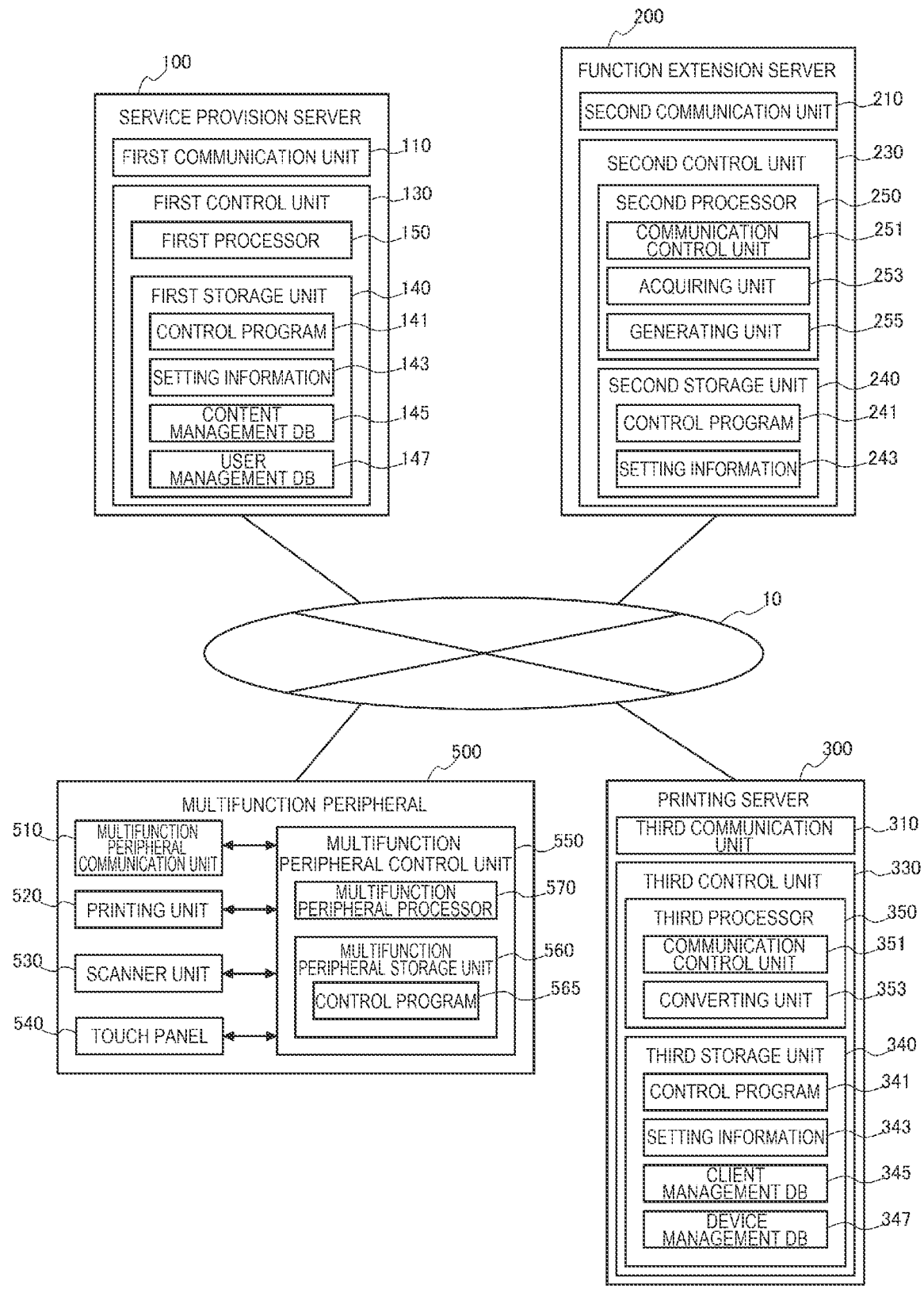
FIG. 2 is a block diagram showing an example of configurations of apparatuses configuring the information processing system.

FIG. 2 is a block diagram showing an example of configurations of the apparatuses configuring the information processing system 1.

First, a configuration of the service provision server 100 is explained.

The service provision server 100 includes a first communication unit 110 and a first control unit 130.

The first communication unit 110 includes a communication interface circuit that executes data communication conforming to a communication standard such as an Ethernet. Ethernet is a registered trademark. The first communication unit 110 mutually performs data communication with the function extension server 200 and the printing server 300 via the network 10.

The first control unit 130 is a computer device including a first storage unit 140 and a first processor 150.

The first storage unit 140 includes a RAM (Random Access Memory) and a ROM (Read Only Memory). The first storage unit 140 includes an auxiliary storage device such as a HDD (Hard Disk Drive) or an SSD (Solid State Drive).

The RAM is used as an operation region of the first processor 150.

The ROM stores a control program 141 to be executed by the first processor 150 and various kinds of setting information 143. The setting information 143 includes a client ID and a secret key used for OAuth authentication with the printing server 300. The client ID and the secret key are authentication information issued to the printing server 300.

The auxiliary storage device stores a content management database 145 for managing a first content file and a user management database 147 for managing a user who is provided with a service. In the following explanation, database is abbreviated as DB.

FIG. 3 is a diagram showing an example of a configuration of the content management DB 145.

One record of the content management DB 145 includes a content ID, a file name, and a first content file.

The content ID is identification information for identifying the first content file. The file name is a file name of the first content file. The first content file is image data in a file format such as a PDF (Portable Document Format) or a JPEG (Joint Photographic Experts Group). The content file may be a document file such as Word or Excel. Word and Excel are registered trademarks.

FIG. 4 is a diagram showing an example of a configuration of the user management DB 147.

One record of the user management DB 147 includes, for example, a user ID and a name, an address, selected subjects, and a mail address of a user. The user ID is identification information for identifying a user who uses a Web service provided by the service provision server 100. The mail address is a mail address set in the multifunction peripheral 500 installed in the user home 5 and is an address for uniquely specifying the multifunction peripheral 500.

The first processor 150 is an arithmetic processing device including a processor such as a CPU (Central Processing Unit) or an MPU (Micro-Processing Unit). The first processor 150 may be configured by a single processor or can also be configured by a plurality of processors. The first processor 150 may be configured by an SoC integrated with a part or the entirety of the first storage unit 140 and other circuits. The first processor 150 may be configured by a combination of a CPU that executes a program and a DSP (Digital Signal Processor) that executes predetermined arithmetic processing. Further, all functions of the first processor 150 may be implemented in hardware or may be configured using a programmable device.

The first control unit 130 starts provision of a first content file to the user, for example, when a preset date and time comes.

First, the first control unit 130 accesses the printing server 300 and receives OAuth authentication by the printing server 300.

When succeeding in the OAuth authentication, the first control unit 130 registers destination information in the printing server 300. The destination information is information indicating a destination of scan data scanned by the multifunction peripheral 500. The destination information is information indicated by a URL. The destination information includes first destination information and second destination information. The first destination information is a URL of a Web page provided by the service provision server 100. The second destination information is a URL of a Web page provided by the function extension server 200.

In the destination information, a destination URL for file reception of the service provision server 100 is added, as a creator parameter, to the URL of the function extension server 200 that is the second destination information. An example of data of the destination information is, for example, as described below.

https://xxx.xxx.xxx/exensions/1/scanning/
        upload?url=https://exaple.co.jp/sample/sample2/
        sample3

As the first destination information, a different URL is set for each user ID. By setting the different URL for each user ID, scan data of a different user can be uploaded to a different URL.

As the first destination information, a plurality of different URLs can be set for the same user.

For example, a different URL may be set for each of selected subjects such as English and mathematics. Consequently, scan data scanned by the multifunction peripheral 500 can be uploaded to different URLs when the scan data is data obtained by scanning a content print 50 of English and when the scan data is data obtained by scanning the content print 50 of mathematics.

The first control unit 130 receives an upload URL from the printing server 300. The upload URL is a URL of a Web page provided by the printing server 300 and is information indicating an upload destination to which the first content file is uploaded.

When receiving the upload URL from the printing server 300, the first control unit 130 transmits an upload request for the first content file to the function extension server 200. The upload request includes additional information added to the first content file, the upload URL received from the printing server 300, a file acquisition URL indicating an acquisition destination of the first content file, and the like. The file acquisition URL is a URL of a Web page provided by the service provision server 100 and is a URL of a Web page from which the first content file uploaded to the printing server 300 can be downloaded.

3. Configuration of the Function Extension Server

Subsequently, a configuration of the function extension server 200 is explained.

The function extension server 200 includes a second communication unit 210 and a second control unit 230.

The second communication unit 210 includes a communication interface circuit that executes data communication conforming to a communication standard such as the Ethernet. The second communication unit 210 mutually performs data communication with the service provision server 100 and the printing server 300 via the network 10.

The second control unit 230 is a computer device including a second storage unit 240 and a second processor 250.

The second storage unit 240 includes a volatile memory such as a RAM and a nonvolatile memory such as a ROM.

The RAM is used as an operation region of the second processor 250.

The ROM stores a control program 241 to be executed by the second processor 250 and various kinds of setting information 243.

The second processor 250 is an arithmetic processing device including a processor such as a CPU or an MPU. The second processor 250 may be configured by a single processor or can also be configured by a plurality of processors. The second processor 250 may be configured by an SoC integrated with a part or the entirety of the second storage unit 240 and other circuits. The second processor 250 may be configured by a combination of a CPU that executes a program and a DSP that executes predetermined arithmetic processing. Further, all functions of the second processor 250 may be implemented in hardware or may be configured using a programable device.

The second processor 250 includes a communication control unit 251, an acquiring unit 253, and a generating unit 255 as functional blocks. The functional blocks show, as blocks, functions realized by the second processor 250 executing the control program 241. The communication control unit 251 is equivalent to the receiving unit and the transmitting unit.

The communication control unit 251 controls the second communication unit 210 and mutually performs data communication with the service provision server 100 and the printing server 300.

For example, the communication control unit 251 receives, from the printing server 300, scan data including a pattern image obtained by encoding additional information and first destination information indicating a destination of the scan data. The communication control unit 251 uploads the scan data and the additional information to a Web page, which is provided by the service provision server 100, indicated by the first destination information.

The acquiring unit 253 decodes the scan data received by the communication control unit 251 to acquire the additional information.

The generating unit 255 changes a data name of the scan data to a data name including the additional information.

When receiving a file upload request from the service provision server 100, the second control unit 230 acquires a file acquisition URL included in the received file upload request. The second control unit 230 accesses a Web page provided by the service provision server 100 indicated by the file acquisition URL. The second control unit 230 downloads a first content file from the accessed Web page.

The second control unit 230 encodes additional information included in the file upload request to generate a two-dimensional code that is an image obtained by encoding the additional information. The second control unit 230 adds the generated two-dimensional code to the first content file to generate a second content file. The second control unit 230 uploads the generated second content file to an address indicated by an upload URL included in the file upload request.

The second control unit 230 receives the scan data and the first destination information from the printing server 300. The second control unit 230 reads the two-dimensional code and decodes the read two-dimensional code to acquire the additional information. The second control unit 230 includes the acquired additional information in the data name of the scan data. For example, the second control unit 230 may include a data name in a part of the data name of the scan data or rewrite the data name of the scan data into additional information. In this embodiment, a case is explained in which the data name of the scan data is rewritten into the additional information. The second control unit 230 uploads the scan data, the data name of which is changed, to the Web page, which is provided by the service provision server 100, indicated by the first destination information. The scan data, the data name of which is changed, is equivalent to the second scan data.

4. Configuration of the Printing Server

Subsequently, a configuration of the printing server 300 is explained.

The printing server 300 includes a third communication unit 310 and a third control unit 330.

The third communication unit 310 includes a communication interface circuit that executes data communication conforming to a communication standard such as the Ethernet. The third communication unit 310 mutually performs data communication with the service provision server 100 and the function extension server 200 via the network 10.

The third control unit 330 is a computer device including a third storage unit 340 and a third processor 350.

The third storage unit 340 includes a RAM, a ROM, and an auxiliary storage device. The RAM is used as an operation region of the third processor 350. The ROM stores a control program 341 to be executed by the third processor 350 and various kinds of setting information 343. The auxiliary storage device stores a client management DB 345 and a device management DB 347.

FIG. 5 is a diagram showing an example of a configuration of the client management DB 345.

One record of the client management DB 345 includes a client ID, a secret key, an access token, and a refresh token issued to the service provision server 100.

The client ID is identification information for identifying a client. In this embodiment, the client ID is information for identifying the service provision server 100. The client ID and the secret key are authentication information used for OAuth authentication. The access token is authentication information linked to a client ID registered for each Web service and is also authority information indicating access authority to the printing server 300. The refresh token is authentication information used to acquire the access token again.

Figure 6:
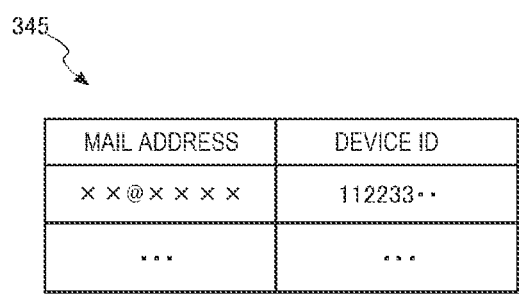
FIG. 6 is a diagram showing an example of a configuration of a device management DB.

FIG. 6 is a diagram showing an example of a configuration of the device management DB 347.

One record of the device management DB 347 includes a mail address and a device ID. The device ID is fixed identification information for identifying the multifunction peripheral 500 that is a device installed in the user home 5. The mail address is also identification information for identifying the multifunction peripheral 500 that is the device installed in the user home 5 and is identification information that can be changed by the user.

The third processor 350 is an arithmetic processing device including a processor such as a CPU or an MPU. The third processor 350 may be configured by a single processor or can also be configured by a plurality of processors. The third processor 350 may be configured by an SoC integrated by a part or the entirety of the third storage unit 340 and other circuits. The third processor 350 may be configured by a combination of a CPU that executes a program and a DSP that executes predetermined arithmetic processing. Further, all functions of the third processor 350 may be implemented in hardware or may be configured using a programmable device.

The third processor 350 includes a communication control unit 351 and a converting unit 353 as functional blocks. The functional blocks show, as blocks, functions realized by the third processor 350 executing the control program 341. The communication control unit 251 is equivalent to the transmitting unit and the receiving unit.

The communication control unit 351 controls the third communication unit 310 and mutually performs data communication with the service provision server 100, the function extension server 200, and the multifunction peripheral 500.

The converting unit 353 converts a second content file received from the function extension server 200 into printing data described by PDL (Page Description Language)

When receiving an authentication request including a client ID and a secret key, the third control unit 330 performs OAoutH authentication based on the received authentication request. When succeeding in the OAoutH authentication, the third control unit 330 transmits a response including an access token, a refresh token, and a device ID to the service provision server 100.

When receiving a destination registration request from the service provision server 100, the third control unit 330 causes the third storage unit 340 to store destination information included in the received destination registration request. The destination information includes first destination information and second destination information.

When receiving the second content file from the function extension server 200, the third control unit 330 converts the received second content file into printing data described by the PDL. The third control unit 330 transmits the converted printing data to the multifunction peripheral 500 designated by the device ID.

When receiving scan data and selected first destination information from the multifunction peripheral 500, the third control unit 330 uploads the received scan data and the received first destination information to a Web page, which is provided by the function extension server 200, indicated by a URL of the second destination information.

5. Configuration of the Multifunction Peripheral

The multifunction peripheral 500 includes a multifunction peripheral communication unit 510, a printing unit 520, a scanner unit 530, and a multifunction peripheral control unit 550.

The multifunction peripheral communication unit 510 includes, for example, a network card and performs wireless communication by a wireless LAN (Local Area Network). The multifunction peripheral communication unit 510 performs wireless communication by Wi-Fi and is connected to a wireless network constructed by the wireless router 3 including an access point function. Wi-Fi is a registered trademark.

The printing unit 520 includes an inkjet head that ejects ink to a printing medium and forms dots, a carriage that causes the inkjet head to perform scan in a scanning direction, a carriage driving motor that drives the carriage, a conveying unit that conveys the printing medium, an ink supply unit that supplies the ink to the inkjet head, and the like. The printing unit 520 ejects the ink from a nozzle of the inkjet head and forms dots on a printing surface of the conveyed printing medium to perform printing on the printing medium according to control of the multifunction peripheral control unit 550.

The scanner unit 530 radiates light emitted by a light source on, for example, a document placed on a not-shown document stand, reads characters and images recorded on the document, and outputs image data obtained by the reading to the multifunction peripheral control unit 550. The multifunction peripheral control unit 550 performs data processing such as RGB conversion and compression processing on the image data input from the scanner unit 530 to generate scan data. The scan data includes a two-dimensional code that is an image obtained by encoding additional information. The scan data is equivalent to the first scan data.

The multifunction peripheral control unit 550 is a computer device including a multifunction peripheral storage unit 560 and a multifunction peripheral processor 570.

The multifunction peripheral storage unit 560 includes a volatile memory such as a RAM and a nonvolatile memory such as a ROM.

The RAM is used as an operation region of the multifunction peripheral processor 570. The ROM stores a control program 565 to be executed by the multifunction peripheral processor 570.

The multifunction peripheral processor 570 is an arithmetic processing device including a processor such as a CPU or an MPU. The multifunction peripheral processor 570 may be configured by a single processor or can also be configured by a plurality of processors. The multifunction peripheral processor 570 may be configured by an SoC integrated with a part or the entirety of the multifunction peripheral storage unit 560 and other circuits. The multifunction peripheral processor 570 may be configured by a combination of a CPU that executes a program and a DSP that executes predetermined arithmetic processing. Further, all functions of the multifunction peripheral processor 570 may be implemented in hardware or may be configured using a programmable device.

When receiving printing data from the printing server 300, the multifunction peripheral control unit 550 controls the printing unit 520 to print an image based on the received printing data on paper. The multifunction peripheral 500 outputs the content print 50. A two-dimensional code 70 is printed on the content print 50.

The user picks up the content print 50 and writes answers to questions described on the content print 50. When finishing writing the answers on the content print 50, the user touches a touch panel 540 and instructs the multifunction peripheral 500 to perform scan.

When the scan is instructed, the multifunction peripheral control unit 550 acquires a list of destination information from the printing server 300 and causes the touch panel 540 to display the acquired list of destination information. The list of destination information displayed on the touch panel 540 is a list of first destination information. In the list of first destination information, for example, URLs corresponding to the first destination information and display names indicating transmission destinations are displayed in association with each other. As the display names, for example, a transmission destination of answers to English questions and a transmission destination of answers to mathematics questions are displayed.

The user refers to the display of the touch panel 540 and selects the first destination information set as a destination of answers.

For example, when a second content file is mathematics questions and the content print 50 is a print on which the second content file is printed, the user selects the first destination information set as an upload destination of answers to the mathematics questions. When the second content file is English questions and the content print 50 is a print on which the second content file is printed, the user selects the first destination information set as an upload destination of answers to the English questions.

When the first destination information is selected by touch on the touch panel 540, the multifunction peripheral control unit 550 controls the scanner unit 530 to start scan. The multifunction peripheral control unit 550 transmits scan data generated by the scan to the printing server 300.

When receiving the scan data from the multifunction peripheral 500, the third control unit 330 of the printing server 300 uploads the received scan data and the first destination information selected by the user to a Web page indicated by the second destination information. The Web page indicated by the second destination information is a Web page provided by the function extension server 200.

6. Operation of the Information Processing System

Subsequently, an operation of the information processing system 1 is explained.

Figure 7:
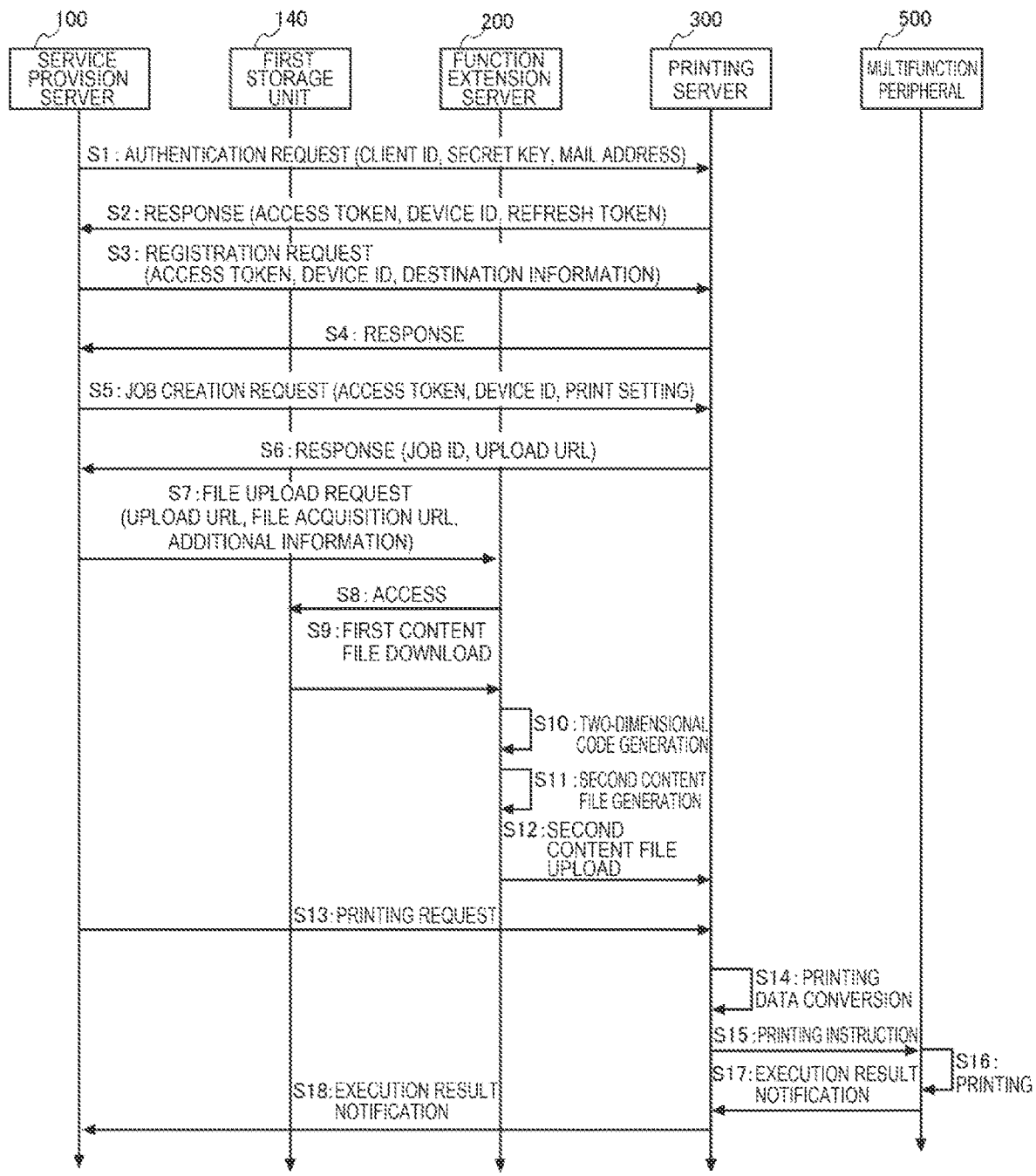
FIG. 7 is a sequence chart showing an operation of the information processing system.

FIG. 7 is a sequence chart showing the operation of the information processing system 1.

First, the first control unit 130 of the service provision server 100 transmits an authentication request to the printing server 300 (step S1). The authentication request includes a client ID, a secret key, a mail address set in the multifunction peripheral 500, and the like.

The third control unit 330 of the printing server 300 receives the authentication request and authenticates the received authentication request. The third control unit 330 determines whether the received client ID and the received secret key are registered in the client management DB 345 and authenticates the authentication request.

When succeeding in the authentication of the authentication request, the third control unit 330 issues an access token and a refresh token and registers the issued access token and the issued refresh token in the client management DB 345. The third control unit 330 refers to the device management DB 347 and acquires a device ID associated with the mail address. The third control unit 330 returns a response including the issued access token and the issued refresh token and the acquired device ID to the service provision server 100 (step S2).

Subsequently, the first control unit 130 of the service provision server 100 transmits a destination registration request including the access token and the device ID received in step S2 and destination information to the printing server 300 (step S3). The destination information includes first destination information and second destination information. The third control unit 330 receives the registration request and causes the third storage unit 340 to store the first destination information and the second destination information included in the registration request. The third control unit 330 transmits a response indicating that the registration request is successful to the service provision server 100 (step S4).

Subsequently, the first control unit 130 generates a job creation request and transmits the generated job creation request to the printing server 300 (step S5). The job creation request includes the access token and the device ID received in step S2 and print setting. The print setting is print setting for the content print 50 to be printed by the multifunction peripheral 500 and is setting of, for example, a color or black and white, duplex printing, and a paper size.

The third control unit 330 generates a response to the received job creation request and transmits the generated response to the service provision server 100 (step S6). The response includes a job ID for identifying a job and an upload URL.

Subsequently, the first control unit 130 transmits a file upload request to the function extension server 200 (step S7). The file upload request includes an upload URL, a file acquisition URL, additional information, and the like.

When receiving the file upload request, the second control unit 230 of the function extension server 200 accesses the file acquisition URL included in the received file upload request (step S8). The second control unit 230 downloads a first content file from the accessed file acquisition URL and acquires the first content file (step S9).

When acquiring the first content file, the second control unit 230 acquires the additional information included in the file upload request received from the service provision server 100 in step S7. The second control unit 230 generates a two-dimensional code including the acquired additional information (step S10). The second control unit 230 attaches the generated two-dimensional code to the first content file to generate the second content file (step S11). The second control unit 230 accesses a Web page of the printing server 300 indicated by the upload URL and uploads the second content file (step S12).

Subsequently, the first control unit 130 transmits a printing request to the printing server 300 (step S13). The printing request includes an access token, a device ID, and a job ID.

When receiving the printing request from the service provision server 100, the third control unit 330 of the printing server 300 converts, according to the print setting received in step S5, the second content file into printing data described by the PDL (step S14). The third control unit 330 transmits a printing instruction including the converted printing data to the multifunction peripheral 500 corresponding to the device ID (step S15).

When receiving the printing instruction from the printing server 300, the multifunction peripheral control unit 550 executes printing of the printing data included in the received printing instruction (step S16) and transmits an execution result notification indicating whether the execution of the printing is successful or unsuccessful to the printing server 300 (step S17).

The third control unit 330 of the printing server 300 causes the third storage unit 340 to store the received execution result notification in association with a processing ID and transmits the received execution result notification to the service provision server 100 (step S18).

Figure 8:
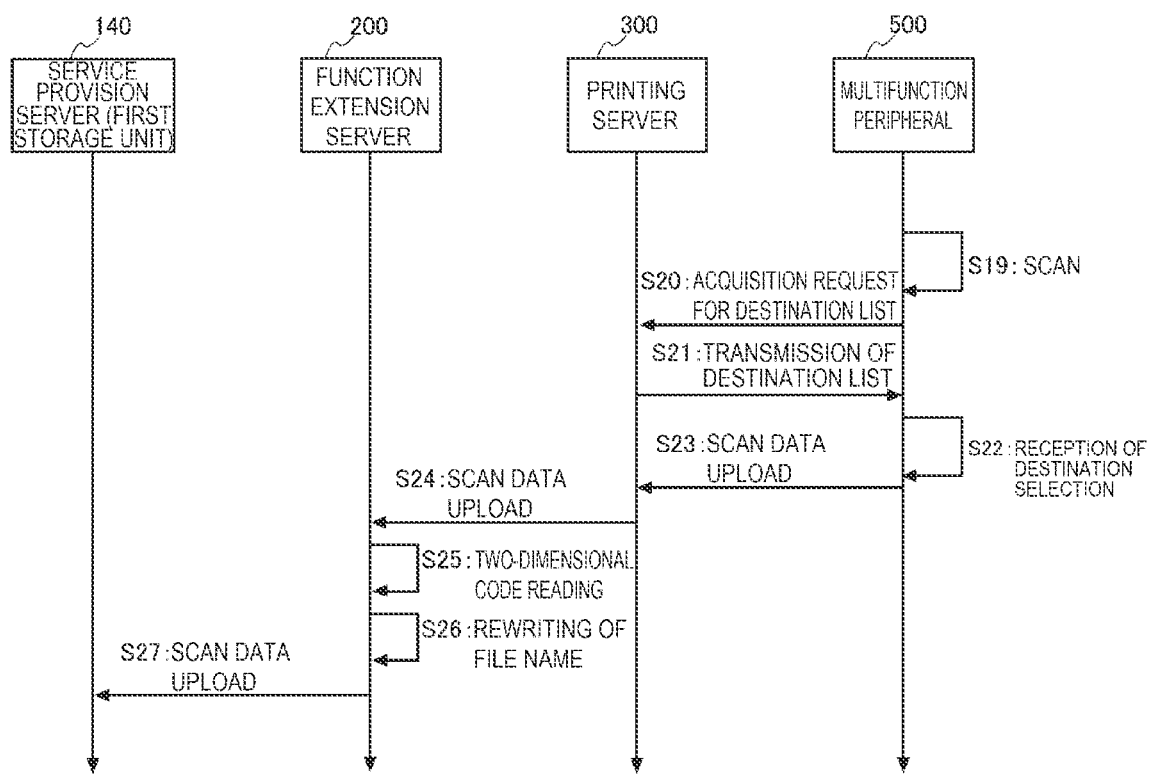
FIG. 8 is a sequence chart showing the operation of the information processing system.

FIG. 8 is a sequence chart showing an operation for uploading scan data from the multifunction peripheral 500 to the service provision server 100.

Subsequently, an operation from scanning, with the multifunction peripheral 500, the content print 50 on which answers are written until transmitting scan data generated by the scan to the service provision server 100 is explained.

When printing data is printed by the multifunction peripheral 500 and the content print 50 is output, the user reads questions described on the content print 50 and writes answers to the questions.

After writing answers to all the questions, the user places, on the document stand of the multifunction peripheral 500, the content print 50 on which the answers are written and touches the touch panel 540 to instruct the multifunction peripheral 500 to perform scan.

When receiving the instruction to scan (step S19), the multifunction peripheral control unit 550 transmits an acquisition request for a destination list to the printing server 300 (step S20). The third control unit 330 transmits a destination list associated with the multifunction peripheral 500 to the multifunction peripheral 500 (step S21). The multifunction peripheral control unit 550 causes the touch panel 540 to display the received destination list (step S22). The destination list displayed on the touch panel 540 is a list of the first destination information. Destinations for each of subjects such as mathematics and English are displayed as a list.

When receiving selection of destination information by touch on the touch panel 540 (step S22), the multifunction peripheral control unit 550 causes the scanner unit 530 to scan the content print 50 placed on the document stand. The multifunction peripheral control unit 550 uploads scan data generated by the scan to the printing server 300 (step S23).

The third control unit 330 of the printing server 300 receives the scan data from the multifunction peripheral 500. The third control unit 330 uploads the received scan data and the first destination information to the Web page, which is provided by the function extension server 200, indicated by the URL of the second destination information (step S24).

When receiving the scan data from the printing server 300, the second control unit 230 of the function extension server 200 acquires scan data from the received scan data. The second control unit 230 reads a two-dimensional code of the acquired scan data and decodes the read two-dimensional code to acquire additional information (step S25). The second control unit 230 changes a data name of the scan data based on the acquired additional information (step S26). The second control unit 230 changes the data name of the scan data to the acquired additional information. The second control unit 230 uploads the scan data, the data name of which is changed, to a Web page, which is provided by the service provision server 100, indicated by a URL of the first destination information (step S27).

Figure 9:
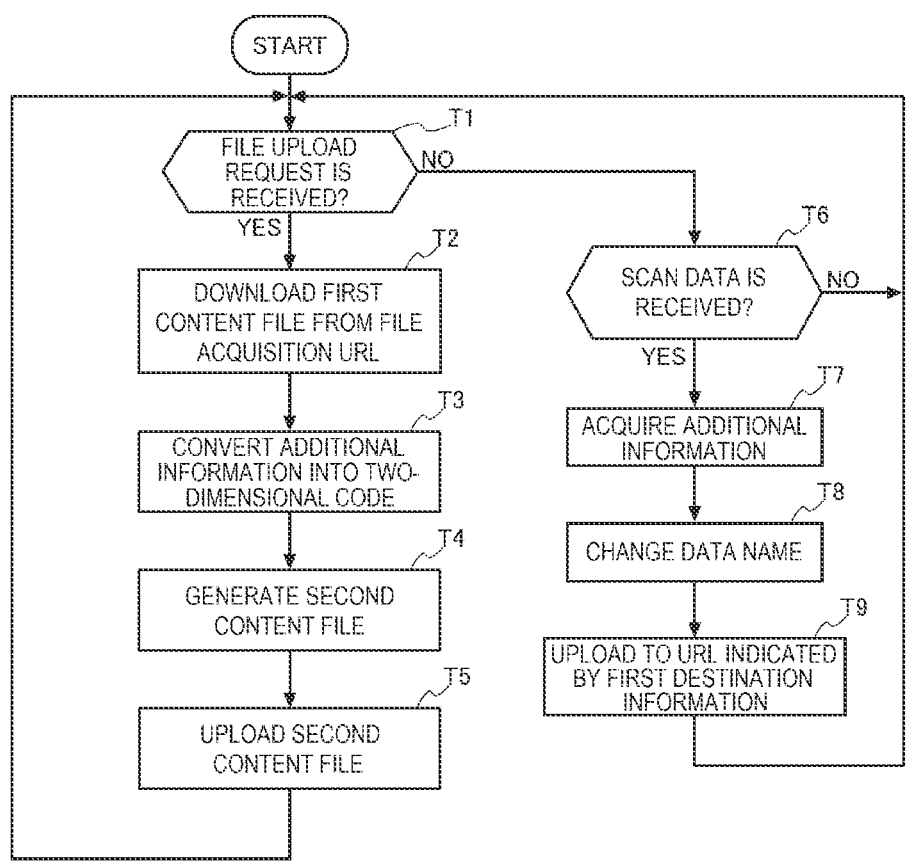
FIG. 9 is a flowchart showing an operation of a function extension server.

FIG. 9 is a flowchart showing an operation of the function extension server 200.

The operation of the function extension server 200 is explained with reference to the flowchart of FIG. 9.

First, the second control unit 230 determines whether a file upload request is received from the service provision server 100 (step T1).

When receiving the file upload request (YES in step T1), the second control unit 230 acquires a file acquisition URL from the received file upload request. The second control unit 230 accesses a Web page of the printing server 300 indicated by the acquired file acquisition URL and downloads a first content file (step T2).

Subsequently, the second control unit 230 extracts additional information included in the file upload request and converts the extracted additional information into a two-dimensional code (step T3). The second control unit 230 adds the converted two-dimensional code to the first content file acquired in step T2 to generate a second content file (step T4). The second control unit 230 acquires an upload URL from the file upload request, accesses a Web page of the printing server 300 indicated by the acquired upload URL, and uploads the second content file (step T5).

When not receiving the file upload request (NO in step T1) but receiving scan data (YES in step T6), the second control unit 230 extracts scan data included in the received scan data. The second control unit 230 reads a two-dimensional code included in the extracted scan data and decodes the read two-dimensional code to acquire additional information (step T7).

Subsequently, the second control unit 230 changes a data name of the scan data based on the acquired additional information (step T8). The second control unit 230 accesses a Web site indicated by a URL of first destination information and uploads the scan data, the data name of which is changed (step T9).

When not receiving scan data (NO in step T6), the second control unit 230 returns to the determination in step T1.

7. Effects

As explained above, the function extension server 200 in this embodiment includes the communication control unit 251 and the acquiring unit 253.

The communication control unit 251 receives scan data including a pattern image obtained by encoding additional information, and destination information indicating a destination of the scan data.

The acquiring unit 253 decodes the pattern image to acquire the additional information.

The communication control unit 251 transmits the scan data and the additional information to the destination indicated by the destination information.

Consequently, it is possible to decode the pattern image included in the received scan data to acquire the additional information and transmit the scan data and the additional information to the destination indicated by the destination information.

Accordingly, it is possible to easily realize addition of functions not implemented in the printing server 300 without changing the configuration of the printing server 300.

The destination information is indicated by a URL. The scan data and the additional information are uploaded to a Web page indicated by the URL.

Consequently, by uploading the scan data and the additional information to the Web page indicated by the URL, it is possible to transmit the scan data and the additional information to the destination indicated by the destination information.

The destination information includes a first URL indicating a destination in the case in which the decoding of the additional information is successful and a second URL indicating a destination in the case in which the decoding of the additional information is unsuccessful.

When the decoding of the additional information is successful, the function extension server 200 uploads the scan data and the additional information to a Web page indicated by the first URL. When the decoding of the additional information is unsuccessful, the function extension server 200 uploads the scan data to a Web page indicated by the second URL.

Consequently, it is possible to upload the scan data to different URLs when the decoding of the additional information is successful and when the decoding of the additional information is unsuccessful.

The function extension server 200 further includes the generating unit 255 that changes the data name of the scan data to a data name corresponding to the additional information.

The communication control unit 251 transmits the scan data, the file name of which is changed, to the destination indicated by the destination information.

Consequently, the scan data, the file name of which is changed to the file name corresponding to the additional information, can be transmitted to the destination indicated by the destination information. Accordingly, it is possible to refer to the additional information by referring to the file name.

When the decoding of the additional information is unsuccessful, the generating unit 255 changes the file name to a file name of scan data including a predetermined character string.

Consequently, when the predetermined character string is included in the file name, it is possible to cause the user to recognize that the decoding of the additional information is unsuccessful.

The scan data is data obtained by scanning a print on which teaching material contents are printed.

The additional information includes at least one of first identification information for identifying an answerer of the teaching material contents and second identification information for identifying the teaching material contents.

Consequently, by referring to the additional information, it is possible to determine the answerer of the scan data and the teaching material contents.

As the URL indicating the destination information, a URL having a different value is set for each piece of the first identification information.

Consequently, the scan data can be uploaded to a different URL for each answerer.

The pattern image is an image of a two-dimensional code obtained by encoding the additional information.

Consequently, compared with when the pattern image is an image of a one-dimensional code obtained by encoding the additional information, it is possible to increase an information amount of the additional information added to the scan data.

The embodiment explained above only indicates an aspect of the present disclosure. Modifications and applications are optionally possible within the scope of the present disclosure.

For example, a plurality of URLs may be set as the first destination information included in the scan data. For example, the first URL and the second URL may be set as the first destination information.

The first URL is a URL indicating an upload destination of the scan data in the case in which the function extension server 200 succeeds in reading the two-dimensional code and acquires the additional information.

The second URL is a URL indicating an upload destination of the scan data in the case in which the function extension server 200 fails in the reading of the two-dimensional code and fails in the acquisition of the additional information.

When failing in the reading of the two-dimensional code and failing in acquiring the additional information, the function extension server 200 may change the file name of the scan data to a file name including a predetermined character string. The predetermined character string only has to be a character string set in advance and may be, for example, "ERROR" or may be repetition of one character.

The configurations of the service provision server 100, the function extension server 200, the printing server 300, and the multifunction peripheral 500 are an example and specific implementation forms of the service provision server 100, the function extension server 200, the printing server 300, and the multifunction peripheral 500 are not particularly limited. That is, hardware individually corresponding to the units does not always need to be implemented. It is naturally possible to adopt a configuration in which one processor executes a program to realize the functions of the units. A part of functions realized by software in the embodiment may be realized by hardware. A part of functions realized by hardware in the embodiment may be realized by software.

For example, the step units of the operations shown in the sequence charts of FIGS. 7 and 8 are divided according to main processing contents in order to facilitate understanding of the operations of the apparatuses of the information processing system 1. The present disclosure is not limited by a way of division and names of the step units. The operations may be divided into, according to processing contents, a larger number of step units and may be divided such that one step unit includes a larger number of kinds of processing. The order of the steps may be changes as appropriate in a range in which the gist of the present disclosure not hindered. The same applies to the flowchart showing the operation of the function extension server 200 shown in FIG. 9.

When the control method for the function extension apparatus is realized using a computer included in the function extension server 200, a program to be executed by the computer can also be configured in a form of a recording medium or a transmission medium for transmitting the program. As the recording medium, a magnetic or optical recording medium or a semiconductor memory device can be used. Specific examples of the recording medium include portable or stationary recording media such as a flexible disk, a HDD (Hard Disk Drive), a CD-ROM, a DVD, a Blu-ray Disc, a magneto-optical disk a flash memory, and a card-type recording medium. The recording medium may be a nonvolatile storage device such as a RAM, a ROM, or a HDD that is an internal storage device included in a server apparatus. Blu-ray is a registered trademark.

What is claimed is:

1. A function extension apparatus that connects to a printing control apparatus that causes a device to execute printing, the function extension apparatus comprising:
    a receiver configured to receive, from the printing control apparatus, first scan data including a pattern image obtained by encoding additional information, and destination information indicating a destination of the first scan data;
    an acquiring unit configured to decode the pattern image to acquire the additional information; and
    a transmitter configured to transmit the first scan data and the additional information to the destination indicated by the destination information, wherein
    the additional information includes first identity information for identifying an answerer of the first scan data and second identify information for identifying the first scan data as a teaching material,
    the first scan data is data obtained by scanning a print on which teaching material contents are printed,
    the additional information includes at least one of first identification information for identifying an answerer of the teaching material contents and second identification information for identifying the teaching material contents, and
    as a URL indicating the destination information, a URL having a different value is set for each piece of the first identification information.

2. The function extension apparatus according to claim 1, wherein
    the destination information is indicated by a URL, and
    the first scan data and the additional information are uploaded to a Web page indicated by the URL.

3. The function extension apparatus according to claim 1, wherein
    the destination information includes a first URL indicating a destination in a case in which the decoding of the additional information is successful and a second URL indicating a destination in a case in which the decoding of the additional information is unsuccessful,
    when the decoding of the additional information is successful, the first scan data and the additional information are uploaded to a Web page indicated by the first URL, and
    when the decoding of the additional information is unsuccessful, the first scan data is uploaded to a Web page indicated by the second URL.

4. The function extension apparatus according to claim 1, further comprising a generator configured to change a data name of the first scan data to a data name corresponding to the additional information to generate second scan data, wherein
    the transmitting the first scan data and the additional information to the destination indicated by the destination information includes transmitting the second scan data to the destination indicated by the destination information.

5. The function extension apparatus according to claim 4, wherein the changing the data name of the first scan data to the data name corresponding to the additional information includes, when the decoding of the additional information is unsuccessful, changing the data name to a data name of the first scan data including a predetermined character string.

6. The function extension apparatus according to claim 1, wherein the pattern image is an image of a two-dimensional code obtained by encoding the additional information.

7. An information processing system comprising an information processing apparatus and a function extension apparatus,
    the information processing apparatus including:
        a receiver configured to receive first scan data including a pattern image obtained by encoding additional information; and
        a transmitter configured to transmit the first scan data and destination information indicating a destination of the first scan data to the function extension apparatus, and
    the function extension apparatus including:
        a receiver configured to receive the first scan data and the destination information;
        an acquiring unit configured to decode the pattern image added to the first scan data to acquire the additional information; and
        a transmitter configured to transmit the first scan data and the additional information to the destination indicated by the destination information, wherein
    the additional information includes first identity information for identifying an answerer of the first scan data and second identify information for identifying the first scan data as a teaching material,
    the first scan data is data obtained by scanning a print on which teaching material contents are printed,
    the additional information includes at least one of first identification information for identifying an answerer of the teaching material contents and second identification information for identifying the teaching material contents, and
    as a URL indicating the destination information, a URL having a different value is set for each piece of the first identification information.

8. A control method for a function extension apparatus, the control method executing:
    receiving first scan data including a pattern image obtained by encoding additional information, and destination information indicating a destination of the first scan data;

decoding the pattern image to acquire the additional information; and transmitting the first scan data and the additional information to the destination indicated by the destination information, wherein the additional information includes first identity information for identifying an answerer of the first scan data and second identify information for identifying the first scan data as a teaching material, the first scan data is data obtained by scanning a print on which teaching material contents are printed, the additional information includes at least one of first identification information for identifying an answerer of the teaching material contents and second identification information for identifying the teaching material contents, and as a URL indicating the destination information, a URL having a different value is set for each piece of the first identification information.

9. A function extension apparatus that connects to a printing control apparatus that causes a device to execute printing, the function extension apparatus comprising:

a receiver configured to receive, from the printing control apparatus, first scan data including a pattern image obtained by encoding additional information, and destination information indicating a destination of the first scan data;

an acquiring unit configured to decode the pattern image to acquire the additional information;

a transmitter configured to transmit the first scan data and the additional information to the destination indicated by the destination information; and a generator configured to change a data name of the first scan data to a data name corresponding to the additional information to generate second scan data, wherein the transmitting the first scan data and the additional information to the destination indicated by the destination information includes transmitting the second scan data to the destination indicated by the destination information.

10. An information processing system comprising an information processing apparatus and a function extension apparatus, the information processing apparatus including:
   a receiver configured to receive first scan data including a pattern image obtained by encoding additional information; and
   a transmitter configured to transmit the first scan data and destination information indicating a destination of the first scan data to the function extension apparatus, and the function extension apparatus including:
   a receiver configured to receive the first scan data and the destination information;
   an acquiring unit configured to decode the pattern image added to the first scan data to acquire the additional information;
   a transmitter configured to transmit the first scan data and the additional information to the destination indicated by the destination information; and
   a generator configured to change a data name of the first scan data to a data name corresponding to the additional information to generate second scan data, wherein the transmitting the first scan data and the additional information to the destination indicated by the destination information includes transmitting the second scan data to the destination indicated by the destination information.

11. A control method for a function extension apparatus, the control method executing:

receiving first scan data including a pattern image obtained by encoding additional information, and destination information indicating a destination of the first scan data;

decoding the pattern image to acquire the additional information;

transmitting the first scan data and the additional information to the destination indicated by the destination information; and changing a data name of the first scan data to a data name corresponding to the additional information to generate second scan data, wherein the transmitting the first scan data and the additional information to the destination indicated by the destination information includes transmitting the second scan data to the destination indicated by the destination information.

* * * * *